US011274942B2

(12) United States Patent
Cai et al.

(10) Patent No.: US 11,274,942 B2
(45) Date of Patent: Mar. 15, 2022

(54) POSITION DETECTION DEVICE

(71) Applicant: TDK CORPORATION, Tokyo (JP)

(72) Inventors: Yongfu Cai, Tokyo (JP); Hiraku Hirabayashi, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 16/887,459

(22) Filed: May 29, 2020

(65) Prior Publication Data

US 2020/0386578 A1 Dec. 10, 2020

(30) Foreign Application Priority Data

Jun. 10, 2019 (JP) .............................. JP2019-108115

(51) Int. Cl.
*G01D 5/16* (2006.01)
(52) U.S. Cl.
CPC ...................................... *G01D 5/16* (2013.01)
(58) Field of Classification Search
CPC ................................ G01R 33/093; G01D 5/16
See application file for complete search history.

(56) References Cited

U.S. PATENT DOCUMENTS

| 8,110,119 B2 | 2/2012 | Breuer et al. |
| 2006/0176142 A1 | 8/2006 | Naito et al. |
| 2008/0169807 A1 | 7/2008 | Naito et al. |
| 2014/0299950 A1* | 10/2014 | Kim ..................... G11C 11/161 257/421 |
| 2015/0192432 A1 | 7/2015 | Noguchi et al. |
| 2018/0275218 A1 | 9/2018 | Umetsu |
| 2018/0356473 A1 | 12/2018 | Hirota et al. |

FOREIGN PATENT DOCUMENTS

| JP | S55-154408 U | 11/1980 |
| JP | H01-250875 A | 10/1989 |
| JP | H09-219546 A | 8/1997 |
| JP | 2004-006752 A | 1/2004 |
| JP | 2005-116828 A | 4/2005 |
| JP | 2006-208020 A | 8/2006 |
| JP | 2008-281556 A | 11/2008 |

(Continued)

OTHER PUBLICATIONS

Translation of Jun. 1, 2021 Office Action issued in Japanese Patent Application No. 2019-108115.

(Continued)

*Primary Examiner* — Minh Q Phan
(74) *Attorney, Agent, or Firm* — Oliff PLC

(57) ABSTRACT

A position detection device includes a magnet that generates a magnetic field to be detected, and a magnetic sensor. The magnetic sensor detects the magnetic field to be detected and generates a detection value corresponding to the position of the magnet. The magnetic sensor includes an MR element and a substrate. The substrate includes a main surface. The magnetic field to be detected received by the MR element has a first direction that changes within a first plane. The MR element includes a magnetic layer having first magnetization that can change in direction within a second plane parallel to the main surface. The first plane and the second plane intersect at a dihedral angle α other than 90°. A detection value depends on the direction of the first magnetization.

6 Claims, 9 Drawing Sheets

(56) References Cited

FOREIGN PATENT DOCUMENTS

| JP | 2008-286739 A | 11/2008 |
| JP | 2012-208063 A | 10/2012 |
| JP | 2018-205241 A | 12/2018 |

OTHER PUBLICATIONS

Sep. 29, 2021 Office Action issued in U.S. Appl. No. 16/878,008.
Translation of Jun. 1, 2021 Office Action issued in Japanese Patent Application No. 2019-105075.
Aug. 20, 2021 Election of Species Requirement issued in US. Appl. No. 16/877,579.
Translation of May 11, 2021 Office Action issued in Japanese Patent Application No. 2019-105074.
Jan. 24, 2022 Office Action issued in U.S. Appl. No. 16/877,579.

\* cited by examiner

POSITION DETECTION DEVICE

BACKGROUND OF THE INVENTION

1. Field of the Invention

The present invention relates to a position detection device using a magnetic sensor.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an optical image stabilization mechanism and an autofocus mechanism incorporated in a smartphone.

A magnetic position detection devices include, for example, a magnet that moves with movement of an object, and a magnetic sensor that detects a magnetic field generated by the magnet. Examples of known magnetic sensors include one that uses a spin-valve magnetoresistive element provided on a substrate. The spin-valve magnetoresistive element includes a magnetization pinned layer having a magnetization whose direction is fixed, a free layer having a magnetization whose direction is variable depending on the direction of an applied magnetic field, and a gap layer located between the magnetization pinned layer and the free layer. In many cases, the spin-valve magnetoresistive element provided on a substrate is configured to have sensitivity to a magnetic field in a direction parallel to the surface of the substrate. Such a magnetoresistive element is thus suitable to detect a magnetic field that changes in direction within a plane parallel to the substrate surface.

Some magnetic position detection devices are configured to detect a magnetic field containing a component in a direction perpendicular to the surface of a substrate by using a magnetoresistive element provided on the substrate. An example of such magnetic position devices is described in US 2015/0192432 A1 and JP H09-219546 A.

US 2015/0192432 A1 describes a magnetic sensor for detecting the position of a magnet. This magnetic sensor includes a substrate, two magnetic sensor elements located on the substrate, a magnet located above the substrate, and a soft magnetic body. The soft magnetic body is located between the magnet and the two magnetic sensor elements. The soft magnetic body converts a magnetic field on an XZ plane, generated by the magnet, into a magnetic field on an XY plane to which the two magnetic sensor elements have sensitivity. The XY plane is parallel to the substrate surface. The XZ plane is perpendicular to the substrate surface.

JP H09-219546 A describes a device in which a magnetoresistive element including magnetic stripes is located on a slope formed on a substrate, and a rotating body including a magnet is located above the substrate. In this device, as the rotating body rotates, the direction of a magnetic field generated by the rotating body changes within a plane of variation perpendicular to the slope. The magnetoresistive element detects the magnetic field generated by the rotating body.

US 2008/0169807 A1 and US 2018/0275218 A1 describe, although not a magnetic position detection device, a device including three sensors for detecting an X-direction component, a Y-direction component, and a Z-direction component of an external magnetic field. In this device, the sensor for detecting the Z-direction component includes a magnetoresistive element located on a slope formed on a substrate.

The magnetic sensor described in US 2015/0192432 A1 has a problem that the detection accuracy can drop due to an unnecessary magnetic field occurring from the soft magnetic body and the magnetic hysteresis characteristics of the soft magnetic body.

Next, a problem with the devices described in JP H09-219546 A, US 2008/0169807 A1, and US 2018/0275218 A1 will be described. The sensor for detecting the Z-direction component in US 2008/0169807 A1 and US 2018/0275218 A1 will hereinafter be referred to as a Z-direction sensor. The magnetic field applied to the magnetoresistive element in JP H09-219546 A and the magnetic field applied to the Z-direction sensor in US 2008/0169807 A1 and US 2018/0275218 A1 will each be referred to as an applied magnetic field. The component of the applied magnetic field to which the magnetoresistive element according to JP H09-219546 A has sensitivity and the component of the applied magnetic field to which the Z-direction sensor according to US 2008/0169807 A1 and US 2018/0275218 A1 has sensitivity will each be referred to as a sensitivity component.

The strength of the applied magnetic field can vary due to reasons such as variations in the arrangement of the constituent parts of the device. The devices described in JP H09-219546 A, US 2008/0169807 A1, and US 2018/0275218 A1 have a problem that the detection accuracy drops greatly relative to variations in the strength of the applied magnetic field. A detailed description thereof is given below.

The lower the strength of the sensitivity component, the greater the degree of drop in the detection accuracy relative to variations in the strength of the applied magnetic field. In the device described in JP H09-219546 A, the direction of the applied magnetic field changes within the plane of variation of the magnetic field perpendicular to the slope. In the device, the direction of the applied magnetic field can thus be perpendicular to the slope, i.e., direction to which the magnetoresistive element has no sensitivity. In such a device, the strength of the sensitivity component can be zero.

In the devices described in US 2008/0169807 A1 and US 2018/0275218 A1, the direction of the applied magnetic field can be perpendicular to the slope, i.e., direction to which the Z-direction sensor has no sensitivity. In such devices, the strength of the sensitivity component can be zero.

In the devices described in JP H09-219546 A, US 2008/0169807 A1, and US 2018/0275218 A1, the detection accuracy can drop greatly relative to variations in the strength of the applied magnetic field if the direction of the applied magnetic field is such that the strength of the sensitivity component has a value of zero or near zero in particular.

SUMMARY OF THE INVENTION

An object of the present invention is to provide a position detection device including a magnetic sensor that detects a magnetic field to be detected and generates a detection value, in which the detection value can be generated while suppressing a drop in detection accuracy even if the magnetic sensor includes a magnetoresistive element suitable to detect a magnetic field that changes in direction within a predetermined plane and the direction of the magnetic field to be detected changes within a variable range including a direction outside the predetermined plane.

A position detection device according to a first aspect of the present invention includes a magnetic field generator that generates a magnetic field to be detected, and a magnetic sensor. The magnetic sensor detects the magnetic field to be detected and generates a detection value corresponding to a relative position of the magnetic field generator with respect to the magnetic sensor.

The magnetic sensor includes a magnetoresistive element and a substrate that supports the magnetoresistive element. The substrate includes a main surface including a flat surface. The magnetic field to be detected received by the magnetoresistive element has a first direction within a first plane. The magnetic field generator and the magnetic sensor are configured such that as the relative position of the magnetic field generator with respect to the magnetic sensor changes, the first direction changes within a predetermined variable range in the first plane. The magnetoresistive element includes a first magnetic layer having first magnetization that can change in direction within a second plane parallel to the main surface. The first plane and the second plane intersect at a dihedral angle other than 90°.

The magnetic field to be detected received by the magnetoresistive element can be divided into an in-plane component parallel to the second plane and a perpendicular component perpendicular to the second plane. The in-plane component has a second direction that changes with a change in the first direction. The direction of the first magnetization changes with a change in the second direction. The detection value depends on the direction of the first magnetization.

In the position detection device according to the first aspect of the present invention, the first magnetic layer may have a characteristic that the first magnetization is saturated by the magnetic field to be detected if the first direction is in at least a part of the variable range.

In the position detection device according to the first aspect of the present invention, the magnetoresistive element may each further include a second magnetic layer having second magnetization in a direction parallel to the second plane, and a gap layer located between the first magnetic layer and the second magnetic layer.

In the position detection device according to the first aspect of the present invention, the dihedral angle may be in a range of 30° to 84°.

In the position detection device according to the first aspect of the present invention, the magnetic field generator may be a magnet. The relative position of the magnetic field generator with respect to the magnetic sensor may be able to change so that a predetermined point in the magnet moves within a linear range of movement parallel to the main surface. The magnet may be magnetized in a direction parallel to a vertical plane that includes the range of movement and is perpendicular to the main surface. The magnetoresistive element may be located to not intersect the vertical plane.

A position detection device according to a second aspect of the present invention includes a magnet that generates a magnetic field to be detected, and a magnetic sensor. The magnetic sensor detects the magnetic field to be detected and generates a detection value corresponding to a relative position of the magnet with respect to the magnetic sensor. The magnetic sensor includes a magnetoresistive element and a substrate that supports the magnetoresistive element. The substrate includes a main surface including a flat surface.

In the position detection device according to the second aspect of the present invention, the magnetoresistive element includes a first magnetic layer having first magnetization that can change in direction with a direction of the magnetic field to be detected received by the magnetoresistive element within a reference plane parallel to the main surface. The relative position of the magnet with respect to the magnetic sensor can change so that a predetermined point in the magnet moves within a linear range of movement parallel to the main surface. The magnet is magnetized in a direction parallel to a vertical plane that includes the range of movement and is perpendicular to the main surface. The magnetoresistive element is located to not intersect the vertical plane.

In the position detection device according to the first aspect of the present invention, the first plane and the second plane intersect at a dihedral angle other than 90°. This prevents the strength of the in-plane component from becoming zero regardless of the first direction within the variable range as long as there is a magnetic field to be detected. According to the position detection device of the first aspect, the detection value can thus be generated while suppressing a drop in the detection accuracy even if the magnetic sensor includes a magnetoresistive element suitable to detect a magnetic field that changes in direction within a predetermined plane and the direction of the magnetic field to be detected changes within a variable range including a direction outside the predetermined plane.

In the position detection device according to the second aspect of the present invention, the relative position of the magnet with respect to the magnetic sensor can change so that the predetermined point in the magnet moves within the linear range of movement parallel to the main surface. The magnet is magnetized in a direction parallel to the vertical plane that includes the range of movement and is perpendicular to the main surface. The magnetoresistive element is located to not intersect the vertical plane. This prevents the strength of the component of the magnetic field to be detected parallel to the reference plane from becoming zero as long as there is a magnetic field to be detected. According to the position detection device of the second aspect, the detection value can thus be generated while suppressing a drop in the detection accuracy even if the magnetic sensor includes a magnetoresistive element suitable to detect a magnetic field that changes in direction within a predetermined plane and the direction of the magnetic field to be detected changes within a variable range including a direction outside the predetermined plane.

Other and further objects, features and advantages of the present invention will appear more fully from the following description.

DETAILED DESCRIPTION OF THE PREFERRED EMBODIMENTS

First Embodiment

Figure 1:
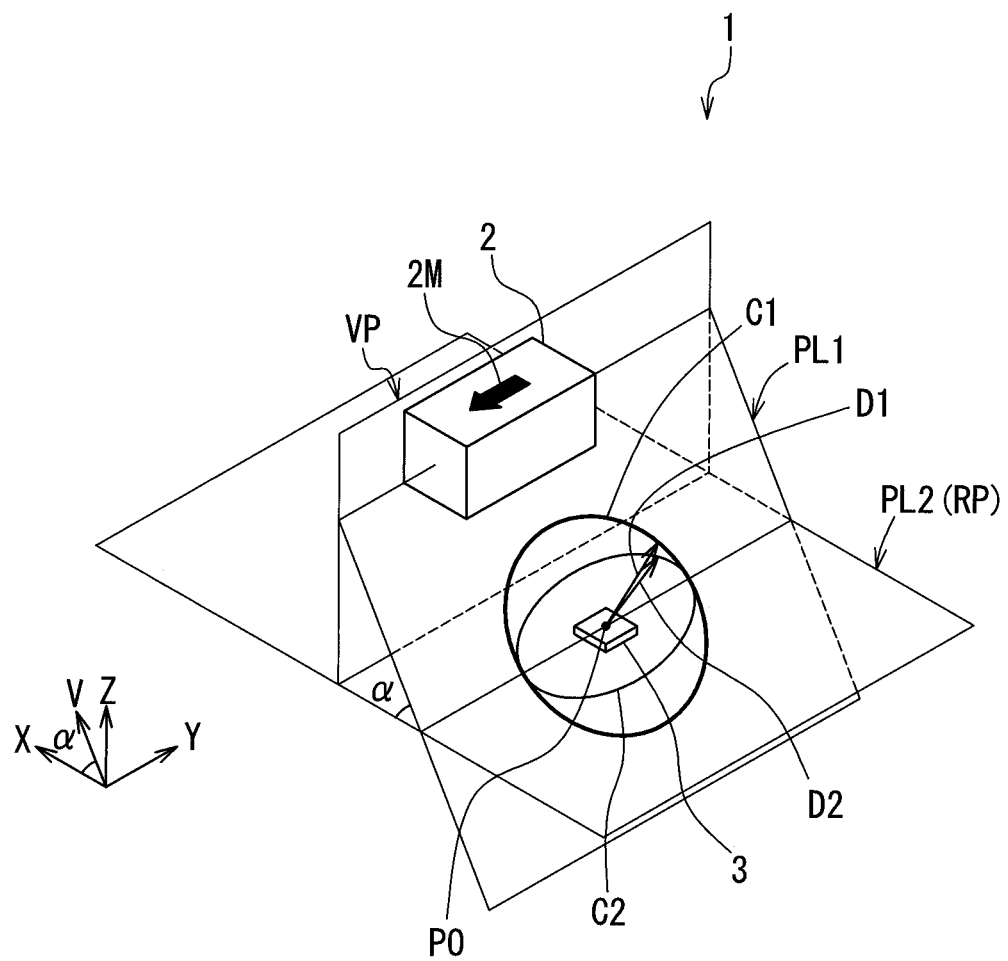
FIG. 1 is a perspective view showing a position detection device according to a first embodiment of the invention.
Figure 2:
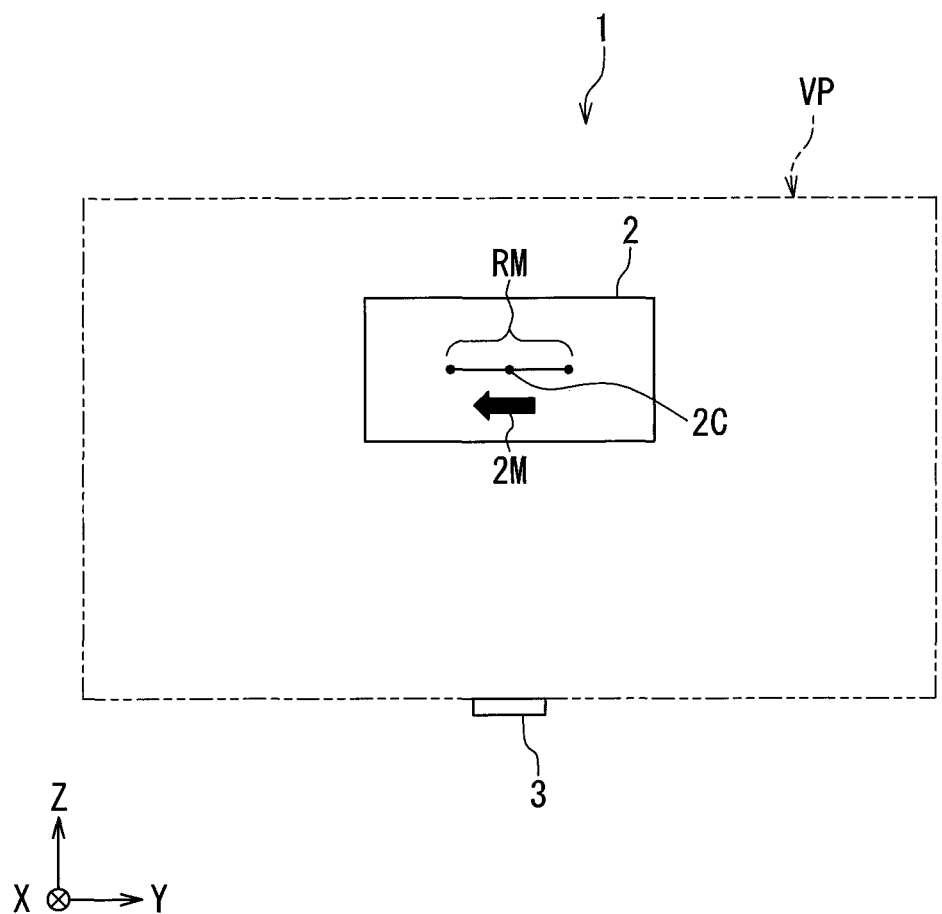
FIG. 2 is a side view showing the position detection device according to the first embodiment of the invention.

Preferred embodiments of the present invention will now be described in detail with reference to the drawings. Initially, a position detection device according to a first embodiment of the invention will be outlined with reference to FIGS. 1 and 2. As shown in FIGS. 1 and 2, a position detection device 1 according to the present embodiment includes a magnetic field generator 2 that generates a magnetic field to be detected and a magnetic sensor 3. The magnetic sensor 3 detects the magnetic field to be detected and generates a detection value θs corresponding to a relative position of the magnetic field generator 2 with respect to the magnetic sensor 3. In particular, in the present embodiment, the magnetic field generator 2 is a magnet. The magnet will hereinafter be also denoted by the reference numeral 2. A description of the magnet 2 applies to the magnetic field generator 2 as well.

As will be described in detail later, the magnetic sensor 3 includes at least one magnetoresistive element (hereinafter, referred to as an MR element) and a substrate that supports the at least one MR element.

X, Y, and Z directions are defined here as shown in FIGS. 1 and 2. The X, Y and Z directions are mutually orthogonal directions. In the present embodiment, the Z direction is a direction perpendicular to the main surface of the substrate in the upward direction in FIGS. 1 and 2. The X and Y directions are both parallel to the main surface of the substrate. The opposite directions to the X, Y, and Z directions are defined as −X, −Y, and −Z directions, respectively. As used hereinafter, the term "above" refers to positions located forward of a reference position in the Z direction, and "below" refers to positions opposite from the "above" positions with respect to the reference position.

A relative position of the magnet 2 with respect to the magnetic sensor 3 can change so that a predetermined point in the magnet 2 moves within a linear predetermined range of movement RM. The relative position of the magnet 2 with respect to the magnetic sensor 3 will hereinafter be referred to simply as the position of the magnet 2. The predetermined point in the magnet 2 will be referred to as a position reference point and denoted by the reference numeral 2C. For example, the position reference point 2C may be a point inside the magnet 2 like the center of gravity of the magnet 2, or a point on the surface of the magnet 2. In the following description, the center of gravity of the magnet 2 is assumed as the position reference point 2C.

The range of movement RM lies in a vertical plane VP perpendicular to the main surface. The vertical plane VP is shown in FIG. 1. FIG. 2 shows a cross section taken along the vertical plane VP. In particular, in the present embodiment, the vertical plane VP refers to a YZ plane. The range of movement RM has the shape of a straight line parallel to the main surface. As shown in FIG. 2, the range of movement RM is represented by a line segment parallel to the Y direction.

The magnet 2 is magnetized in a direction parallel to the vertical plane VP. In particular, in the present embodiment, the magnet 2 is magnetized in the −Y direction. In FIGS. 1 and 2, the arrow denoted by the reference numeral 2M indicates the direction of magnetization of the magnet 2.

Figure 3:
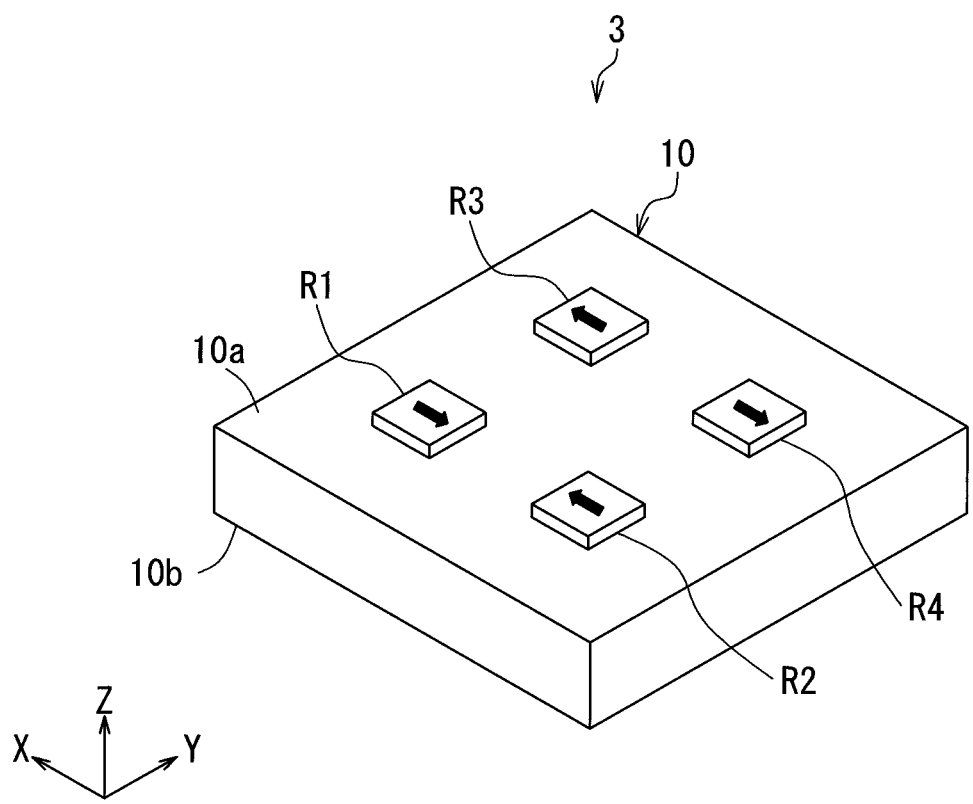
FIG. 3 is a perspective view showing an example configuration of a magnetic sensor of the first embodiment of the invention.
Figure 4:
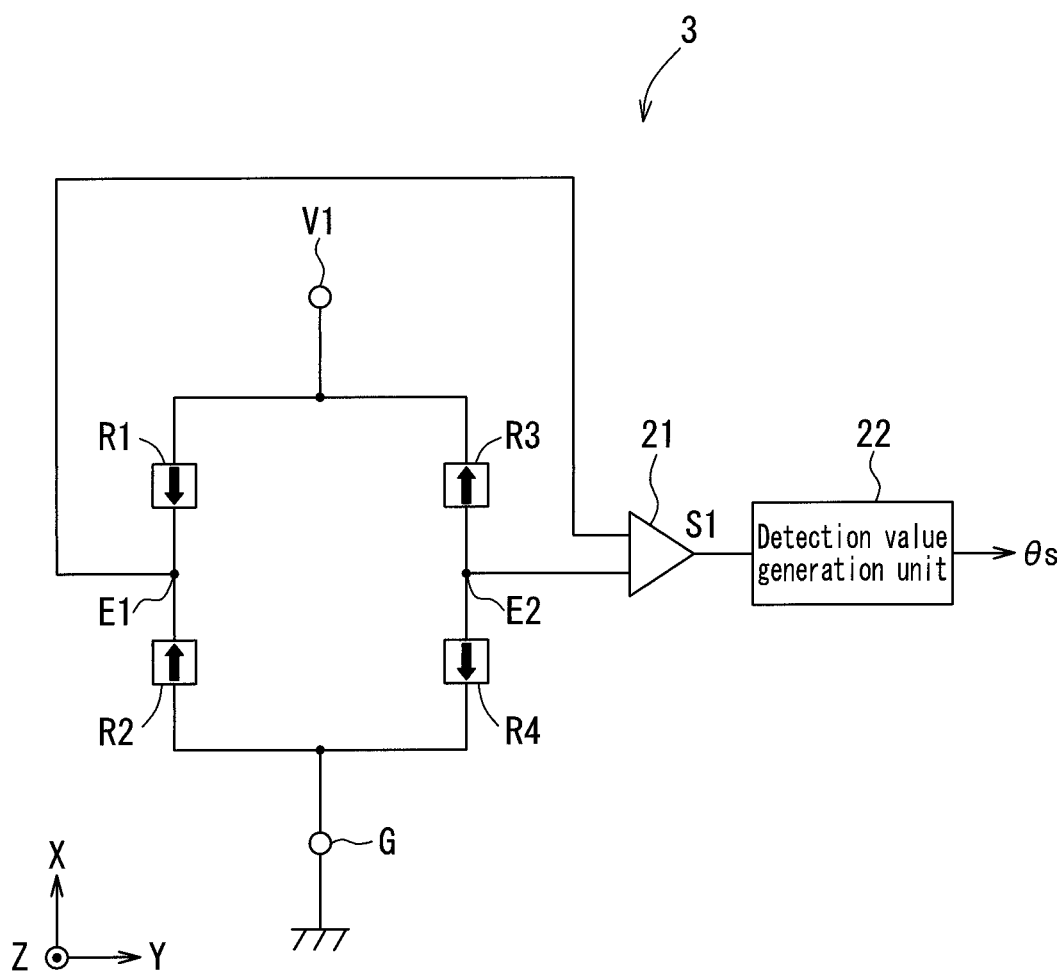
FIG. 4 is a circuit diagram showing an example circuit configuration of the magnetic sensor of the first embodiment of the invention.

Next, an example configuration of the magnetic sensor 3 will now be described with reference to FIGS. 3 and 4. FIG. 3 is a perspective view showing the example configuration of the magnetic sensor 3. FIG. 4 is a circuit diagram showing an example circuit configuration of the magnetic sensor 3. In this example, as shown in FIG. 3, the magnetic sensor 3 includes four MR elements R1, R2, R3 and R4, and a substrate 10 that supports the four MR elements R1, R2, R3 and R4. The substrate 10 has a flat plate shape. The substrate 10 has a top surface 10a and a bottom surface 10b that are flat surfaces. The top surface 10a lies at the end of the substrate 10 in the Z direction. The bottom surface 10b lies at the end of the substrate 10 in the −Z direction. Both the top surface 10a and the bottom surface 10b are the XY plane, and correspond to the foregoing main surface. The MR elements R1, R2, R3, and R4 are located on the top surface 10a.

In describing an arbitrary one of the MR elements R1, R2, R3, and R4, the MR element will hereinafter be denoted by the symbol R. The magnetic field to be detected received by an MR element R has a first direction within a first plane. The magnet 2 and the magnetic sensor 3 are configured such that, as the position of the magnet 2 changes, the first direction changes within a predetermined variable range in the first plane.

If the magnetic sensor 3 includes a plurality of MR elements R, the first plane and the first direction are defined for each MR element R. However, the MR elements R1, R2, R3, and R4 are located within an area where no substantial difference occurs in the direction of the magnetic field to be detected depending on the position where the MR elements R1, R2, R3, and R4 receive the magnetic field to be detected. The directions of the magnetic field to be detected received by the MR elements R1, R2, R3, and R4 are therefore substantially the same. In addition, the first planes corresponding to the MR elements R1, R2, R3, and R4 are parallel to each other. In the following description, the first planes corresponding to the respective MR elements R will thus be represented by one first plane denoted by the symbol PL1. The first plane PL1 is shown in FIG. 1. The first plane PL1 is parallel to the first planes corresponding to the MR elements R1, R2, R3, and R4. The direction of the magnetic field to be detected at a reference position P0 on the first plane PL1 will be referred to as a first direction D1. The first direction D1 is the same as the first directions corresponding to the MR elements R1, R2, R3, and R4. The first directions of the respective MR elements R will hereinafter be represented by the first direction D1.

The MR element R includes a first magnetic layer having first magnetization that can change in direction within a second plane PL2 parallel to the main surface. The second plane PL2 is shown in FIG. 1. In particular, in the present embodiment, the second plane PL2 is an XY plane.

As shown in FIG. 1, the first plane PL1 and the second plane PL2 intersect at a dihedral angle α other than 90°. α is an angle greater than 0° and smaller than 90°.

Suppose here that a direction rotated from the Z direction toward the X direction by α will be referred to as a V direction. The direction opposite to the V direction will be referred to as a −V direction. The first plane PL1 is a plane parallel to the Y direction and the V direction, i.e., YV planes.

As shown in FIG. 1, the magnetic sensor 3 is located to not intersect the vertical plane VP. The MR elements R included in the magnetic sensor 3 are therefore also located to not intersect the vertical plane VP. Specifically, the magnetic sensor 3 and the MR elements R are located forward of the −X direction with respect to the intersection line of the vertical plane VP and the second plane PL2. The magnet 2 is located above the second plane PL2.

The magnetic field to be detected received by the MR element R can be divided into an in-plane component parallel to the second plane PL2 and a perpendicular component perpendicular to the second plane PL2.

In the present embodiment, the second plane PL2 is also referred to as a reference plane RP. In terms of the reference plane RP, the first magnetic layer of the MR element R can be said to have first magnetization that can change in direction within the reference plane RP parallel to the main surface. The first plane PL1 and the reference plane RP intersect at a dihedral angle of α other than 90°.

The MR element R may be a spin valve MR element or an anisotropic MR element. In particular, in the present embodiment, the MR element R is a spin valve MR element. In this case, the MR element R includes a second magnetic layer and a gap layer aside from the foregoing first magnetic layer. The second magnetic layer has second magnetization in a direction parallel to the second plane PL2. The gap layer is located between the first and second magnetic layers. The direction of the second magnetization does not change. The spin-valve MR element may be a tunneling magnetoresistive (TMR) element or a giant magnetoresistive (GMR) element. In the TMR element, the gap layer is a tunnel barrier layer. In the GMR element, the gap layer is a nonmagnetic conductive layer. The resistance of the MR element R changes with an angle that the direction of the first magnetization of the first magnetic layer forms with respect to the direction of the second magnetization of the second magnetic layer. The resistance is minimized if the angle is 0°. The resistance is maximized if the angle is 180°. In FIGS. 3 and 4, the thick arrow indicates the direction of the second magnetization.

In the present embodiment, the directions of the second magnetization in the MR elements R1 and R4 are the −X direction. The directions of the second magnetization in the MR elements R2 and R3 are the X direction. From the viewpoint of the manufacturing accuracy of the MR element R, the directions of the second magnetization may be slightly different from the foregoing direction.

As shown in FIG. 4, the magnetic sensor 3 further includes a power supply node V1, a ground node G, a first signal output node E1 and a second signal output node E2. The MR element R1 and the MR element R2 are connected in series via the first signal output node E1. The MR element R1 is arranged between the power supply node V1 and the first signal output node E1. The MR element R2 is arranged between the first signal output node E1 and the ground node G. The MR element R3 and the MR element R4 are connected in series via the second signal output node E2. The MR element R3 is arranged between the power supply node V1 and the second signal output node E2. The MR element R4 is arranged between the second signal output node E2 and the ground node G. A predetermined magnitude of power supply voltage is applied to the power supply node V1. The ground node G is grounded.

The magnetic sensor 3 further includes a differential detector 21 and a detection value generation unit 22. The differential detector 21 outputs a detection signal S1 corresponding to a potential difference between the signal output nodes E1 and E2. The detection value generation unit 22 generates the detection value θs on the basis of the detection signal S1. The detection value generation unit 22 includes an application specific integrated circuit (ASIC) or a microcomputer, for example.

Figure 5:
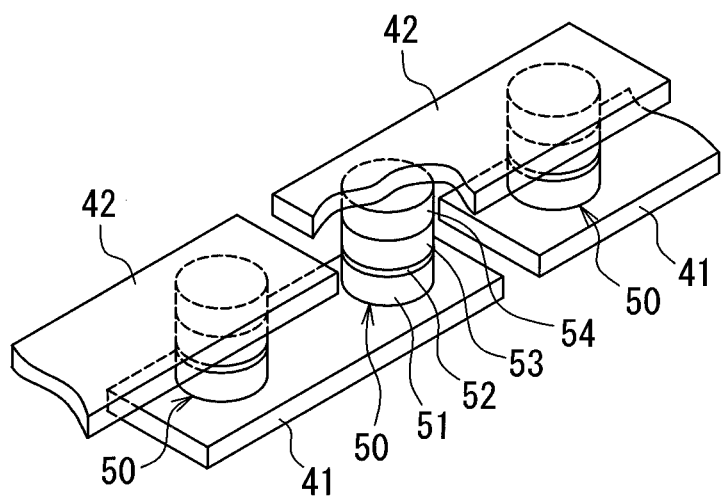
FIG. 5 is a perspective view showing a part of a magnetoresistive element of the first embodiment of the invention.

An example of the configuration of the MR element R will now be described with reference to FIG. 5. FIG. 5 is a perspective view showing a part of the MR element R. In this example, the MR element R includes a plurality of lower electrodes 41, a plurality of MR films 50 and a plurality of upper electrodes 42. The plurality of lower electrodes 41 are located on the top surface 10a of the substrate 10. Each of the lower electrodes 41 has a long slender shape. Every two lower electrodes 41 adjacent to each other in the longitudinal direction of the lower electrodes 41 have a gap therebetween. As shown in FIG. 5, MR films 50 are provided on the top surfaces of the lower electrodes 41, near opposite ends in the longitudinal direction. Each of the MR films 50 includes a first magnetic layer 51, a gap layer 52, a second magnetic layer 53, and an antiferromagnetic layer 54 which are stacked in this order, the first magnetic layer 51 being closest to the lower electrode 41. The first magnetic layer 51 is electrically connected to the lower electrode 41. The antiferromagnetic layer 54 is formed of an antiferromagnetic material. The antiferromagnetic layer 54 is in exchange coupling with the second magnetic layer 53 so as to pin the magnetization direction of the second magnetic layer 53. The plurality of upper electrodes 42 are arranged over the plurality of MR films 50. Each of the upper electrodes 42 has a long slender shape, and establishes electrical connection between the respective antiferromagnetic layers 54 of two adjacent MR films 50 that are arranged on two lower electrodes 41 adjacent in the longitudinal direction of the lower electrodes 41. With such a configuration, the plurality of MR films 50 in the MR element R shown in FIG. 5 are connected in series by the plurality of lower electrodes 41 and the plurality of upper electrodes 42. It should be appreciated that the layers 51 to 54 of the MR films 50 may be stacked in an order reverse to that shown in FIG. 5.

Figure 6:
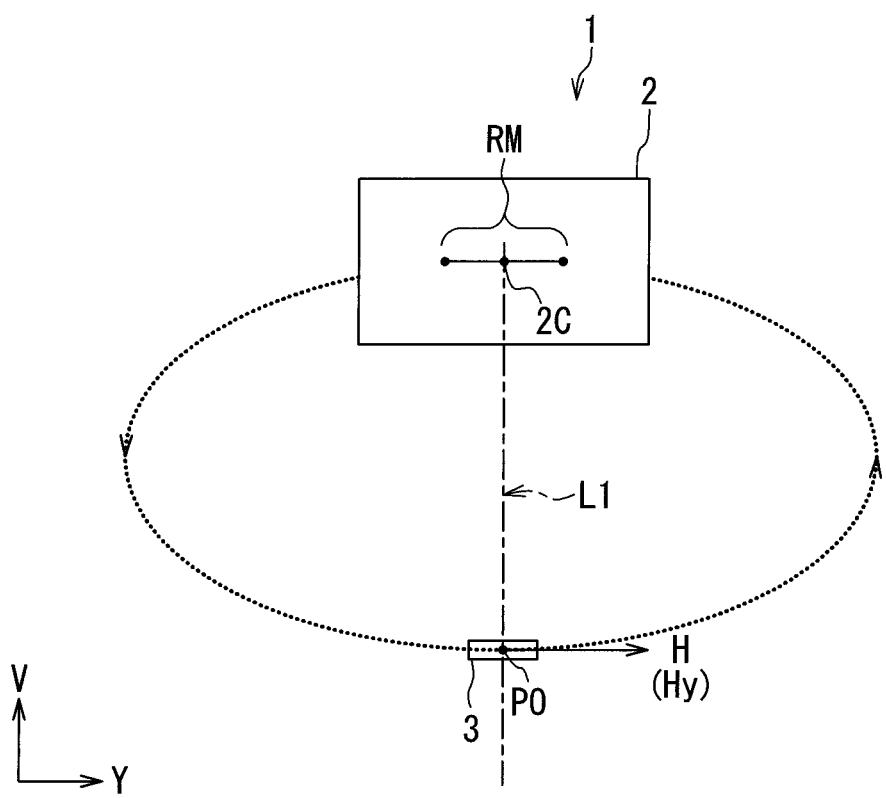
FIG. 6 is an explanatory diagram showing a magnet on a first plane and a magnetic field to be detected in the first embodiment of the invention.
Figure 7:
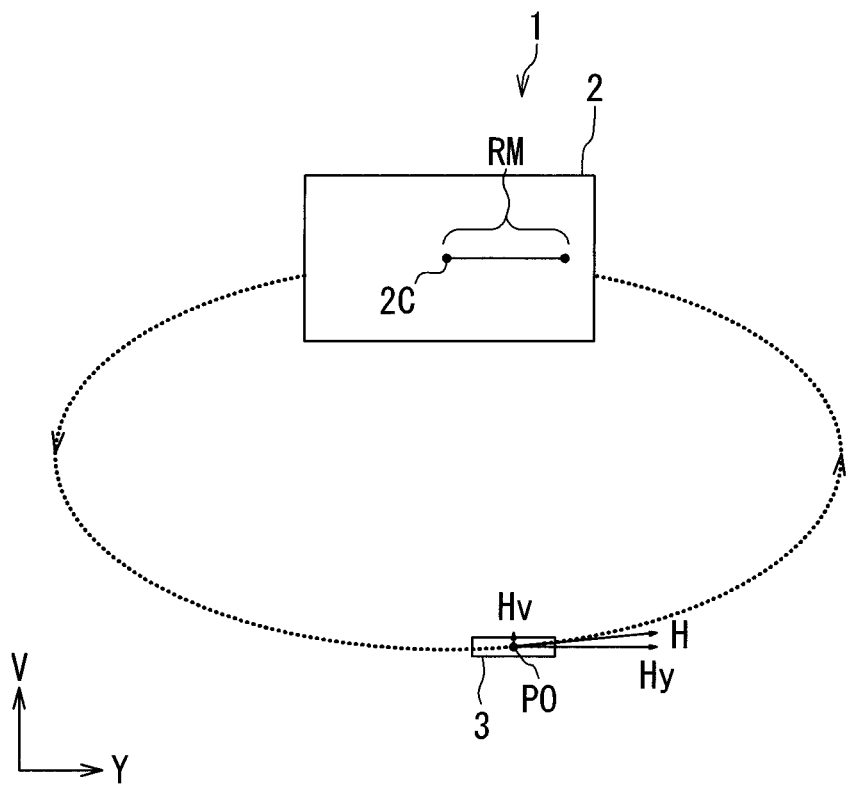
FIG. 7 is an explanatory diagram showing the magnet on the first plane and a magnetic field to be detected in the first embodiment of the invention.
Figure 8:
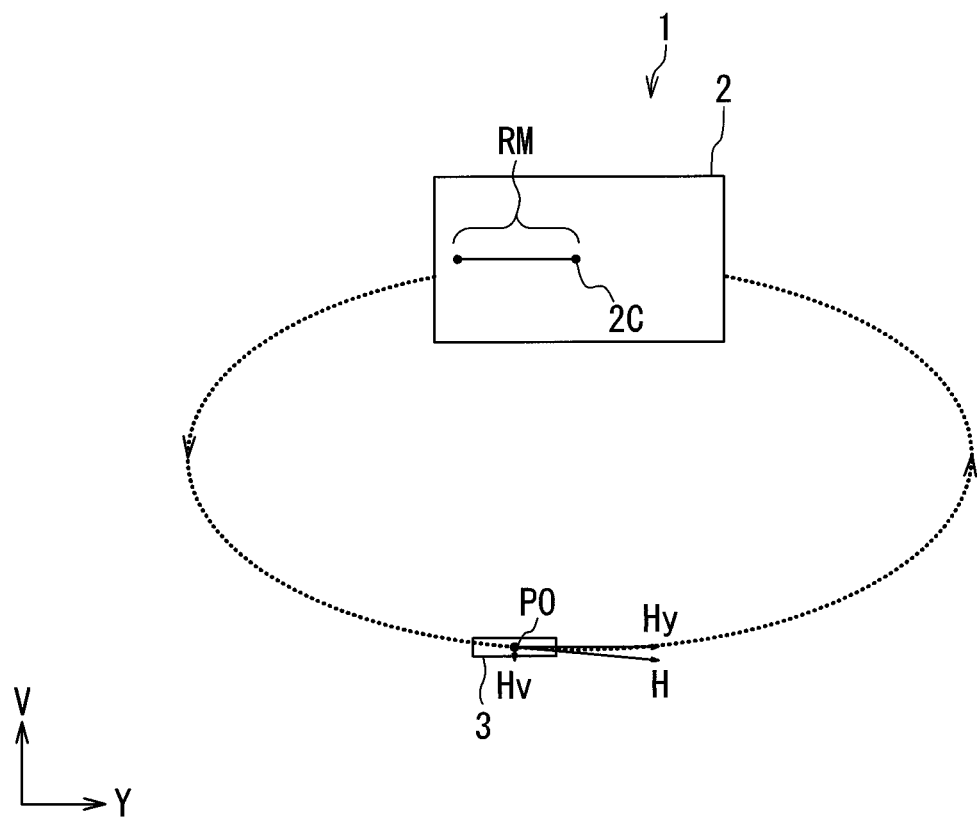
FIG. 8 is an explanatory diagram showing the magnet on the first plane and a magnetic field to be detected in the first embodiment of the invention.

Next, the relationship between the position of the magnet 2 and the magnetic field to be detected will be described with reference to FIGS. 6 to 8. FIGS. 6 to 8 show the magnet 2 and the magnetic sensor 3 on the first plane PL1. In FIGS. 6 to 8, the dotted line represents a part of a magnetic flux corresponding to the magnetic field to be detected. In the following description, the position of the magnet 2 will be represented by the position of the position reference point 2C. In such a case, the range of movement RM can be said to be the range of movement of the position of the magnet 2. FIG. 6 shows a state where the magnet 2 lies at the center of the range of movement RM. FIG. 7 shows a state where the magnet 2 lies at the end in the −Y direction of the range of movement RM. FIG. 8 shows a state where the magnet 2 lies at the end in the Y direction of the range of movement RM.

The magnetic field to be detected at the reference position P0 will be hereinafter denoted by the symbol H. As shown in FIG. 6, in the present embodiment, the center point in the range of movement RM falls on a virtual line L1 that passes through the reference position P0 and is parallel to the V direction.

As shown in FIGS. 6 to 8, the magnetic field to be detected H can be divided into a first component Hv in a direction parallel to the V direction and a second component Hy in a direction parallel to the Y direction. In the state shown in FIG. 6, the first component Hv is 0 and the second component Hy is equal to the magnetic field to be detected H. As the position of the magnet 2 changes, the direction of the magnetic field to be detected H, i.e., the first direction D1 changes. An angle that the first direction D1 forms with respect to a predetermined reference direction will be hereinafter referred to as a first angle and denoted by the symbol $\theta 1$. In the present embodiment, the reference direction is the V direction. The first angle $\theta 1$ is expressed in positive values when seen in a direction of rotation from the V direction to the Y direction, and expressed in negative values when seen in a direction of rotation from the V direction to the −Y direction. As the position of the magnet 2 changes, the first angle $\theta 1$ changes. The first angle $\theta 1$ thus has a correlation with the position of the magnet 2.

Next, the magnetic field to be detected and the in-plane component will be described with reference to FIG. 1. As the position of the magnet 2 changes within the range of movement RM, the first direction D1 changes within a predetermined variable range in the first plane PL1. In FIG. 1, the arrow denoted by the symbol D1 represents the first direction D1 and the strength of the magnetic field to be detected H at the reference position P0. The end of the arrow denoted by the symbol D1 moves along a circle denoted by the symbol C1. In the present embodiment, the variable range of the first direction D1 is 180° or less in size. The variable range of the first angle $\theta 1$ is from 0° to 180° at maximum.

The in-plane component on the second plane PL2 has a second direction D2 that changes with a change in the first direction D1. In FIG. 1, the arrow denoted by the symbol D2 represents the second direction D2 and the strength of the in-plane component on the second plane PL2. The end of the arrow denoted by the symbol D2 moves along an ellipse denoted by the symbol C2. The second direction D2 and the ellipse C2 are orthogonal projections of the first direction D1 and the circle C1 upon the second plane PL2, respectively.

An angle that the second direction D2 forms with respect to the X direction will hereinafter be referred to as a second angle and denoted by the symbol $\theta 2$. The second angle $\theta 2$ is expressed in positive values when seen in a direction of rotation from the X direction to the Y direction, and expressed in negative values when seen in a direction of rotation from the X direction to the −Y direction. The second angle $\theta 2$ has a correlation with the first angle $\theta 1$. In the present embodiment, the variable range of the second direction D2 is 180° or less in size. The variable range of the second angle $\theta 2$ is from 0° to 180° at maximum.

If the first angle $\theta 1$ is 0°, the second angle $\theta 2$ is also 0°. If the first angle $\theta 1$ is 90°, the second angle $\theta 2$ is also 90°. If the first angle $\theta 1$ is 180°, the second angle $\theta 2$ is also 180°.

Next, a relationship between the first and second angles $\theta 1$ and $\theta 2$ and the detection signal S1 will be described. The resistance of an MR element R depends on the direction of the first magnetization in the first magnetic layer of the MR element R. The direction of the first magnetization in the first magnetic layer of the MR element R changes with a change in the second direction D2, i.e., a change in the second angle $\theta 2$. In the magnetic sensor 3 shown in FIGS. 3 and 4, the resistances of the MR elements R1 and R4 are maximized and the resistances of the MR elements R2 and R3 are minimized if the second angle $\theta 2$ is 0°. The resistances of the MR elements R1 and R4 are minimized and the resistances of the MR elements R2 and R3 are maximized if the second angle $\theta 2$ is 180°.

The resistances of the respective MR elements R1, R2, R3 and R4 therefore change with the direction of the first magnetization and with a change in the second angle $\theta 2$. As described above, the second angle $\theta 2$ has a correlation with the first angle $\theta 1$. The resistances of the MR elements R1, R2, R3, and R4 therefore depend on the first angle $\theta 1$ as well.

The detection signal S1 corresponds to the potential difference between the signal output nodes E1 and E2. The potential of the signal output node E1 depends on the resistances of the MR elements R1 and R2. The potential of the signal output node E2 depends on the resistances of the MR elements R3 and R4. The detection signal S1 thus depends on the resistances of the MR elements R1, R2, R3, and R4.

Consequently, the detection signal S1 depends on the directions of the first magnetization, the first angle $\theta 1$, and the second angle $\theta 2$.

The configuration of the magnetic sensor 3 is not limited to that shown in FIGS. 3 and 4. For example, the magnetic sensor 3 may include the MR elements R1 and R2 without the MR elements R3 and R4. In such a case, a signal corresponding to the potential of the signal output node E1 may be used as the detection signal S1. The detection signal S1 here also depends on the directions of the first magnetization, the first angle $\theta 1$, and the second angle $\theta 2$.

The magnetic sensor 3 may include a resistor having a constant resistance instead of the MR element R1, without the MR elements R3 and R4. In such a case also, a signal corresponding to the potential of the signal output node E1 may be used as the detection signal S1. The detection signal S1 here also depends on the directions of the first magnetization, the first angle $\theta 1$, and the second angle $\theta 2$.

Next, the detection value $\theta s$ generated by the detection value generation unit 22 will be described. The detection value $\theta s$ depends on the detection signal S1. As described above, the detection signal S1 depends on the directions of the first magnetization, the first angle $\theta 1$, and the second angle $\theta 2$. The detection value $\theta s$ thus depends on the directions of the first magnetization, the first angle $\theta 1$, and the second angle $\theta 2$.

In particular, in the present embodiment, the detection value $\theta s$ is a value indicating the first angle $\theta 1$. As described above, the first angle $\theta 1$ has a correlation with the position of the magnet 2. The detection value $\theta s$ thus corresponds to the position of the magnet 2. The detection signal $\theta s$ may be a value indicating the position of the magnet 2 itself, or a value indicating the second angle $\theta 2$. As described above, the second angle $\theta 2$ has a correlation with the first angle $\theta 1$, and the first angle $\theta 1$ has a correlation with the position of the magnet 2. The second angle $\theta 2$ thus has a correlation with the position of the magnet 2, and the detection value $\theta s$ indicating the second angle $\theta 2$ also has a correlation with the position of the magnet 2.

Figure 9:
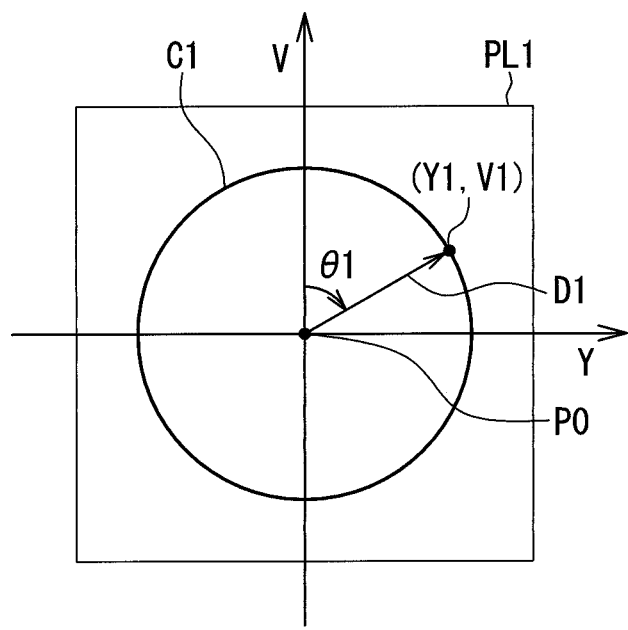
FIG. 9 is an explanatory diagram for describing a first direction and a first angle in the first embodiment of the invention.

A method for generating the detection value $\theta s$ will be specifically described with reference to FIGS. 9 and 10. FIG.

9 shows the first direction D1, the first angle θ1, and the circle C1. FIG. 10 shows the second direction D2, the second angle θ2, and the ellipse C2. Initially, the method for generating the detection value θs will be outlined. The arrow indicating the first direction D1 shown in FIG. 9 can be said to represent a vector representing the direction and strength of the magnetic field to be detected received by the MR element R in the YV coordinate system with the reference position P0 as the origin. Such a vector will hereinafter be referred to as a first vector D1. The Y component and the V component of the first vector D1 will be denoted by Y1 and V1, respectively.

Figure 10:
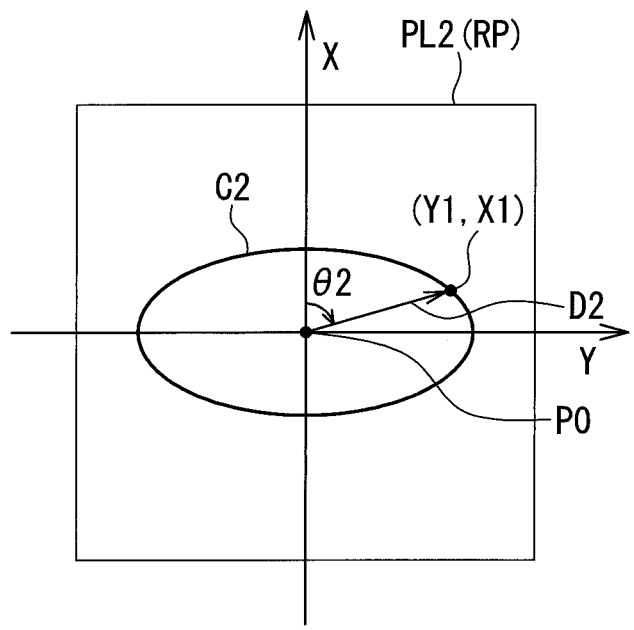
FIG. 10 is an explanatory diagram for describing a second direction and a second angle in the first embodiment of the invention.

The arrow indicating the second direction D2 shown in FIG. 10 can be said to represent a vector representing the direction and strength of the in-plane component received by the MR element R in the YX coordinate system with the reference position P0 as the origin. Such a vector will hereinafter be referred to as a second vector D2. The second vector D2 is an orthogonal projection of the first vector D1 on the second plane PL2. The Y component of the second vector D2 has the same value as that of the Y component of the first vector D1, i.e., Y1. The Y and X components of the second vector D2 will hereinafter be denoted by Y1 and X1, respectively.

V1 can be expressed by using X1 and the dihedral angle α. The ratio Y1/V1 can thus be expressed by using the ratio Y1/X1 and the dihedral angle α. An equation representing a relationship between the first angle θ1 and the second angle θ2 can be obtained by using a relationship between the ratio Y1/V1 and the first angle θ1, a relationship between the ratio Y1/X1 and the second angle θ2, and a relationship between the ratio Y1/V1 and the ratio Y1/X1.

A value θ2s representing the second angle θ2 can be determined by using the first detection signal S1. In the present embodiment, the detection value generation unit 22 generates the detection value θs by determining θ2s and substituting θ2s into the equation representing the relationship between the first angle θ1 and the second angle θ2.

Next, a specific method for calculating the detection value θs will be described. The ratio Y1/V1 and the ratio Y1/X1 are represented by the following Eqs. (1) and (2), respectively:

$$Y1/V1 = \tan\theta1, \quad (1) \text{ and}$$

$$Y1/X1 = \tan\theta2. \quad (2)$$

V1 is represented by the following Eq. (3):

$$V1 = X1/\cos\alpha. \quad (3)$$

Transforming Eq. (1) and substituting Eqs. (2) and (3) into the transformed equation yields the following Eq. (4):

$$\theta1 = a\tan(Y1/V1)$$
$$= a\tan(Y1/(X1/\cos\alpha))$$
$$= a\tan(\cos\alpha \cdot Y1/X1)$$
$$= a\tan(\cos\alpha \cdot \tan\theta2). \quad (4)$$

Eq. (4) represents the relationship between the first angle θ1 and the second angle θ2. The symbol "a tan" represents the arctangent.

In the magnetic sensor 3 shown in FIGS. 3 and 4, the detection signal S1 is minimized if the second angle θ2 is 0°. The detection signal S1 is maximized if the second angle θ2 is 180°.

The detection signal S1 can be normalized such that the detection signal S1 has a value of −1 if the second angle θ2 is 0°, a value of 0 if the second angle θ2 is 90°, and a value of 1 if the second angle θ2 is 180°. In such a case, the detection signal S1 can be represented by the following Eq. (5):

$$S1 = -\cos\theta2. \quad (5)$$

Now, first and second examples where the first angle θ1 has different variable ranges will be described. In the first example, the variable range of the first angle θ1 is from 0° to 180°. In the second example, the variable range is greater than 0° and smaller than 180°.

In both the first and second examples, the detection value generation unit 22 calculates the value θ2s by the following Eq. (6):

$$\theta2s = a\cos(-S1). \quad (6)$$

In the first example, the range of the value θ2s is from 0° to 180°. In the second example, the range of the value θ2s is greater than 0° and smaller than 180°. Eq. (6) is obtained by replacing θ2 in Eq. (5) with θ2s and transforming the resultant. The symbol "a cos" represents the arccosine.

In the first example, the detection value generation unit 22 calculates the detection value θs by the following Eq. (7) excluding the exceptions to be described later:

$$\theta s = a\tan(\cos\alpha \cdot \tan\theta2s). \quad (7)$$

The range of the detection value θs is from 0° to 180°. Eq. (7) is obtained by replacing θ1 and θ2 in Eq. (4) with θs and θ2s respectively and transforming the resultant.

The foregoing exceptions refer to situations where the value θ2s is 0° or 180°. If the value θ2s is 0° or 180°, θs in Eq. (7) has two solutions, 0° or 180°. The detection value generation unit 22 then simply uses the value θ2s itself as the detection value θs if the value θ2s is 0° or 180°. Such exception handling uses the fact that if the first angle θ1 is 0°, the second angle θ2 is also 0°, and if the first angle θ1 is 180°, the second angle θ2 is also 180°.

In the second example, there is no such exception, and the detection value generation unit 22 always calculates the detection value θs by Eq. (7).

The processing content of the detection value generation unit 22 is not limited to the foregoing example. For example, the detection value generation unit 22 may retain a table indicating the correspondence between the detection signal S1 and the detection value θs, and generate the detection value θs from the detection signal S1 by referring to the table. The correspondence between the detection signal S1 and the detection value θs in the foregoing table may be theoretically determined as described above, or determined by experiment.

Next, the operation and effect of the position detection device 1 according to the present embodiment will be described. The magnetic sensor 3 of the position detection device 1 includes at least one MR element R. Each MR element R includes the first magnetic layer having the first magnetization that can change in direction within a predetermined plane, namely, the second plane PL2. Each MR element R is thus suitable to detect the magnetic field that changes in direction within the predetermined plane, i.e., the second plane PL2.

The magnetic field to be detected received by the MR element R has a first direction within the first plane. As the position of the magnet 2 changes, the first direction changes within a predetermined variable range in the first plane. The first direction corresponding to the MR element R is the same as the first direction D1 that is the direction of the magnetic field to be detected at the reference position P0 in the first plane PL1. The variable range of the first direction corresponding to the MR element R is the same as that of the first direction D1.

As the position of the magnet 2 changes, the first direction corresponding to the MR element R changes within the variable range including a direction outside the predetermined plane. According to the present embodiment, the magnetic sensor 3 includes the MR element R suitable to detect a magnetic field that changes in direction within a predetermined plane. The direction of the magnetic field to be detected received by the MR element R changes within the variable range including a direction outside the predetermined plane. Even in such a case, the detection value θs corresponding to the position of the magnet 2 can be generated while suppressing a drop in the detection accuracy in the following manner.

In the present embodiment, the first plane PL1 and the second plane PL2 intersect at a dihedral angle α other than 90°. Each MR element R can thus detect the in-plane component that is a component of the magnetic field to be detected. The second direction D2 that is the direction of the in-plane component change with a change in the first direction D1. The first direction D1 changes with a change in the position of the magnet 2. Therefore, the second direction D2 also changes with the change in the position of the magnet 2.

In each MR element R, the direction of the first magnetization changes with a change in the second direction D2. The detection value θs depends on the direction of the first magnetization. Consequently, the detection value θs depends on the first direction D1 and the second direction D2, and corresponds to the position of the magnet 2.

If the first plane is orthogonal to the second plane PL2, the strength of the in-plane component can be zero or near zero in value depending on the first direction D1. Examples where the first plane is orthogonal to the second plane PL2 include when the MR element R is located to intersect the vertical plane VP and the first plane coincides with the vertical plane VP. In this case, the strength of the in-plane component has a value of 0 if the first direction D1 is perpendicular to the second plane PL2, and has a value near 0 if the first direction D1 is almost perpendicular to the second plane PL2. If the strength of the in-plane component has a value of 0 or near 0, the detection accuracy of the magnetic sensor 3 drops greatly with respect to variations in the strength of the magnetic field to be detected.

By contrast, in the present embodiment, the MR element R is located to not intersect the vertical plane VP. As a result, the first plane PL1 and the second plane PL2 intersect at a dihedral angle α other than 90°. This prevents the strength of the in-plane component from becoming zero regardless of the first direction D1 within the variable range as long as there is a magnetic field to be detected. According to the position detection device 1 of the present embodiment, the detection value θs corresponding to the position of the magnet 2 can be generated while suppressing a drop in the detection accuracy even if the magnetic sensor 3 includes the MR elements R suitable to detect a magnetic field that changes in direction within a predetermined plane and the direction of the magnetic field to be detected received by the MR element R changes within the variable range including the direction outside the predetermined plane.

In the present embodiment, the magnet 2 is magnetized in a direction parallel to the vertical plane VP perpendicular to the main surface of the substrate 10. The range of movement RM of the magnet 2 has the shape of a straight line parallel to the main surface. The MR element R includes a first magnetic layer having first magnetization that can change in direction within a second plane PL2 parallel to the main surface. According to the present embodiment, such a positional relationship facilitates defining the position relationship between the magnetic sensor 3 and the magnet 2.

A favorable range of the dihedral angle α will now be described. Assuming that the magnetic field to be detected has a strength of H1, the minimum value of the strength of the in-plane component is H1·cos α. The minimum value of the strength of the in-plane component is preferably 10% or more of H1, more preferably 30% or more. The dihedral angle α is thus preferably 84° or less, more preferably 73° or less. On the other hand, if the dihedral angle α it too small, the distance between the magnet 2 and the magnetic sensor 3 becomes too large, and the strength of the magnetic field to be detected received by the MR element R becomes too low. The distance between the magnet 2 and the magnetic sensor 3 is desirably twice the distance between the magnet 2 and the magnetic sensor 3 in the Z direction or less, preferably 1.5 times or less. The dihedral angle α is therefore preferably 30° or greater, more preferably 42° or greater. In summary, the dihedral angle α is preferably in the range of 30° to 84°, more preferably in the range of 42° to 73°.

The direction of the first magnetization in the first magnetic layer of the MR element R preferably follows a change in the second direction D2 of the in-plane component with high accuracy. For that purpose, the first magnetic layer preferably has a characteristic that the first magnetization is saturated by the magnetic field to be detected if the first direction D1 of the magnetic field to be detected is in at least a part of the variable range. The first magnetic layer more preferably has a characteristic that the first magnetization is saturated by the magnetic field to be detected regardless of what direction within the variable range the first direction D1 is.

If the MR element R is a spin valve MR element, the first magnetic layer preferably has a small uniaxial magnetic anisotropy in order for the direction of the first magnetization of the first magnetic layer to follow a change in the second direction D2 with high accuracy.

The first magnetic layer of the MR element R may have a characteristic that the first magnetization is saturated by the magnetic field to be detected regardless of what direction within the variable range the first direction D1 is. In this case, the direction of the first magnetization of the first magnetic layer does not vary depending on variations in the strength of the magnetic field to be detected. This can reduce variations in the detection value θs due to variations in the strength of the magnetic field to be detected. The strength of the magnetic field to be detected can vary, for example, due to a change in the ambient temperature and variations in the positional relationship between the magnetic sensor 3 and the magnet 2.

The position detection device 1 according to the present embodiment can be used as an device for detecting the position of various types of objects if the position detection device is configured such that the magnet 2 moves with the movement of the objects to detect the position thereof. For example, the position detection device 1 can be applied to a camera module including the following optical image stabilization mechanism. The camera module includes a lens, a support mechanism, and a driving unit. The optical axis direction of the lens is parallel to the Z direction in the present embodiment. The support mechanism supports the lens such that the lens can move in first and second directions perpendicular to the Z direction. The driving unit is a unit for moving the lens in the first and second directions.

In such a camera module, the position of the lens in the first direction and the position of the lens in the second direction need to be detected. The position detection device 1 according to the present embodiment can be used to detect the position of the lens. If the position detection device 1 is used to detect the position of the lens in the first direction, the position detection device 1 can be configured such that the magnet 2 moves in a direction parallel to the Y direction in the present embodiment along with the movement of the lens in the first direction. Similarly, if the position detection device 1 is used to detect the position of the lens in the second direction, the position detection device 1 can be configured such that the magnet 2 moves in a direction parallel to the Y direction in the present embodiment along with the movement of the lens in the second direction.

The position detection device 1 according to the present embodiment, for example, can be applied to a camera module including the following autofocus mechanism. The camera module includes a lens, a support mechanism, and a driving unit. The optical axis direction of the lens is parallel to the Y direction in the present embodiment. The support mechanism supports the lens such that the lens can move in a direction parallel to the Y direction. The drive unit is a unit for moving the lens in the direction parallel to the Y direction.

In such a camera module, the position of the lens in the direction parallel to the Y direction needs to be detected. The position detection device 1 according to the present embodiment can be used to detect the position of the lens. In such a case, the position detection device 1 can be configured such that the magnet 2 moves in the direction parallel to the Y direction along with the movement of the lens.

Second Embodiment

Figure 11:
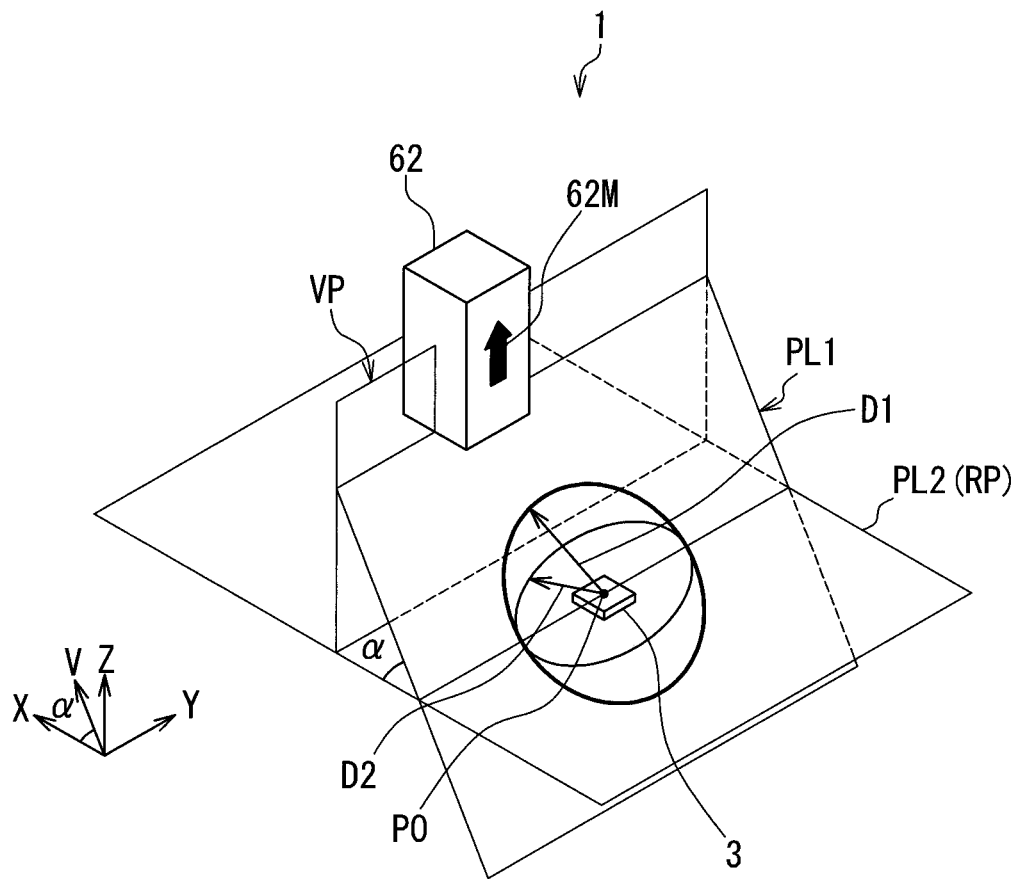
FIG. 11 is a perspective view showing a position detection device according to a second embodiment of the invention.
Figure 12:
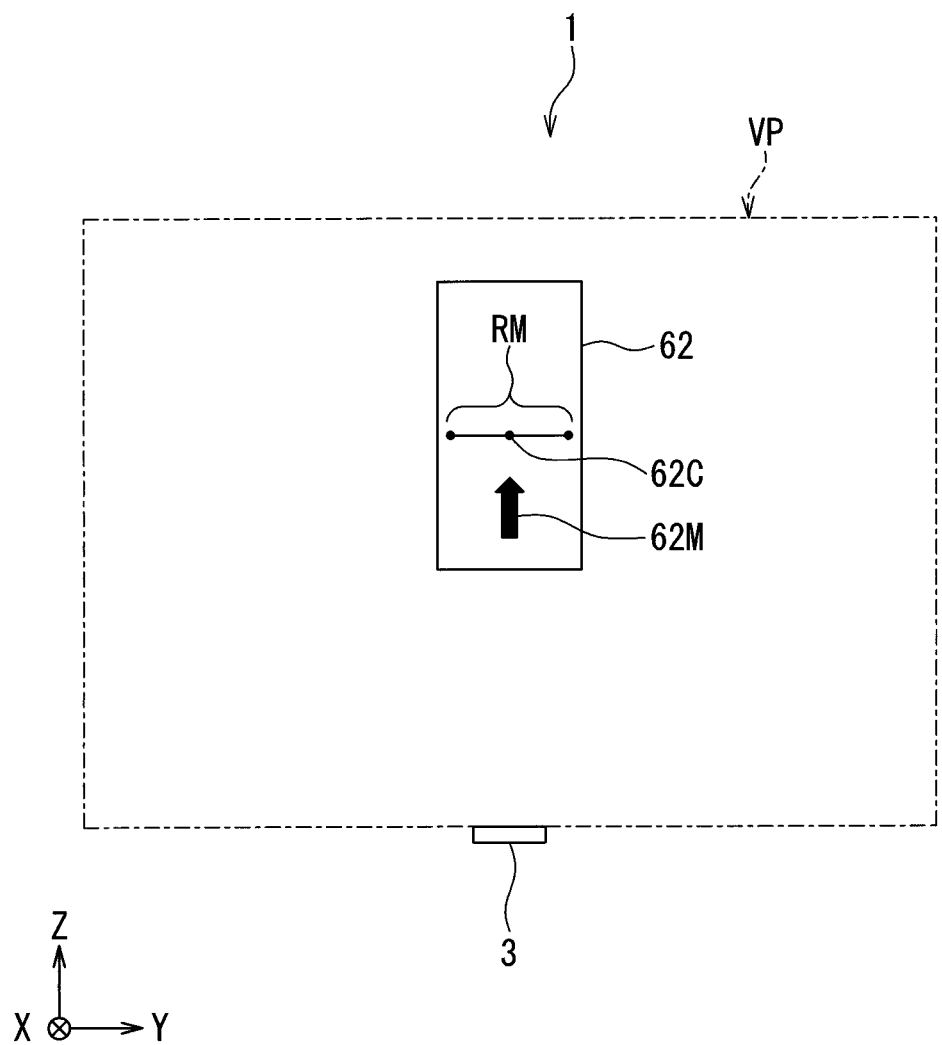
FIG. 12 is a side view showing the position detection device according to the second embodiment of the invention.

A second embodiment of the invention will now be described. FIG. 11 is a perspective view of a position detection device 1 according to the present embodiment. FIG. 12 is a side view of the position detection device 1 according to the present embodiment. Differences of the position detection device 1 according to the present embodiment from the position detection device 1 according to the first embodiment will be described below. The position detection device 1 according to the present embodiment includes a magnetic field generator 62 instead of the magnetic field generator 2 of the first embodiment. In particular, in the present embodiment, the magnetic field generator 62 is a magnet. The magnet will hereinafter be also denoted by the reference numeral 62. A description of the magnet 62 applies to the magnetic field generator 62 as well.

The magnet 62 is magnetized in a direction parallel to the vertical plane VP. In particular, in the present embodiment, the magnet 62 is magnetized in the Z direction. In FIGS. 11 and 12, the arrow denoted by the reference numeral 62M indicates the direction of magnetization of the magnet 62.

Like the first embodiment, the relative position of the magnet 62 with respect to the magnetic sensor 3 will be referred to simply as the position of the magnet 62. The relative position of the magnet 62 can change so that a position reference point 62C in the magnet 62 moves within a range of movement RM. An example of the position reference point 62C is the center of gravity of the magnet 62.

The range of movement RM of the present embodiment is the same as that of the first embodiment. More specifically, the range of movement RM lies in a vertical plane VP perpendicular to the main surface. The vertical plane VP is shown in FIG. 11. FIG. 12 shows a cross section taken along the vertical plane VP. The range of movement RM has the shape of a straight line parallel to the main surface. As shown in FIG. 12, the range of movement RM is represented by a line segment parallel to the Y direction.

In the present embodiment, a first plane PL1 representing the first plane of each MR element R, a reference position P0, a first direction D1, a first angle θ1, a second plane PL2, a second direction D2, a second angle θ2, and a reference plane RP are defined as in the first embodiment.

Figure 13:
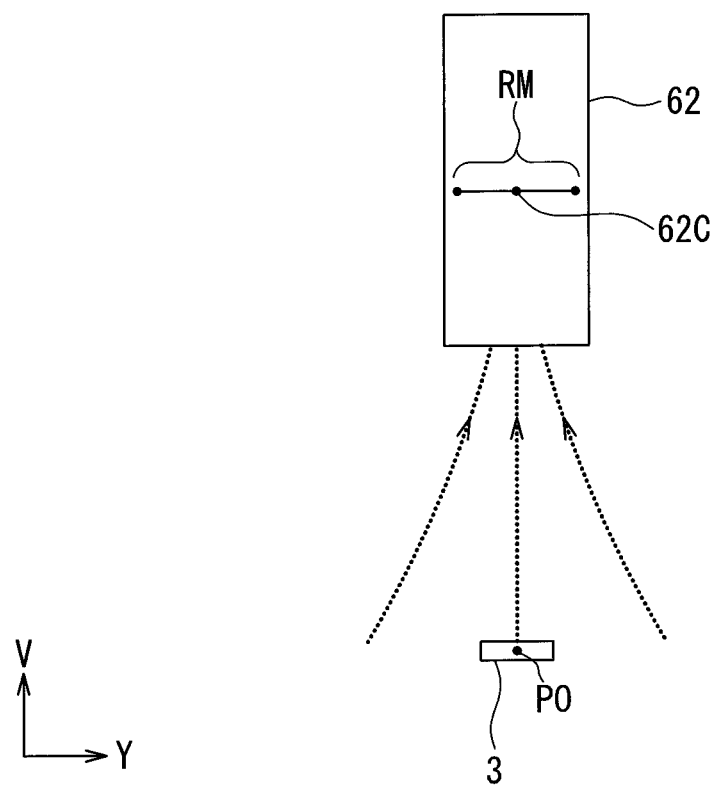
FIG. 13 is an explanatory diagram showing a magnet on a first plane and a magnetic field to be detected in the second embodiment of the invention.

FIG. 13 shows the magnet 62 and the magnetic sensor 3 on the first plane PL1. In FIG. 13, a plurality of dotted lines represent a part of a magnetic flux corresponding to the magnetic field to be detected.

As the position of the magnet 62 changes within the range of movement RM, the first direction D1 that is the direction of the magnetic field to be detected H at the reference position P0 changes within a predetermined variable range in the first plane PL1. This can easily be seen from FIG. 13. More specifically, as the position of the magnet 62 changes within the range of movement RM, the direction of the magnetic flux passing through the reference position P0, i.e., the first direction D1 changes.

In the present embodiment, the first angle θ1 and the second angle θ2 have a correlation with the position of the magnet 62 as in the first embodiment.

In the present embodiment, the variable range of the first direction D1 is 180° or less in size. The variable range of the first angle θ1 is from −90° to 90° at maximum. The variable range of the second direction D2 is 180° or less in size. The variable range of the second angle θ2 is from −90° to 90° at maximum.

In the present embodiment, the directions of the second magnetization in the MR elements R1 and R4 are the Y direction. The directions of the second magnetization in the MR elements R2 and R3 are the −Y direction. The detection signal S1 can be normalized so that the detection signal S1 has a value of −1 if the second angle θ2 is −90°, a value of 0 if the second angle θ2 is 0°, and a value of 1 if the second angle θ2 is 90°. In this case, instead of Eq. (5) in the first embodiment, the detection signal S1 can be represented by the following Eq. (8):

$$S1 = \sin \theta 2. \tag{8}$$

Instead of Eq. (6) in the first embodiment, the detection value generation unit 22 of the present embodiment calculates the value θ2s by the following Eq. (9):

$$\theta 2s = a \sin S1. \tag{9}$$

Here, the symbol "a sin" represents the arcsine.

The configuration, operation and effects of the present embodiment are otherwise the same as those of the first embodiment.

The present invention is not limited to the foregoing embodiments, and various modifications may be made thereto. For example, in the present invention, the direction of magnetization of the magnet 2 may be one parallel to the vertical plane VP, other than those described in the first and second embodiments.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A position detection device comprising:
a magnetic field generator that generates a magnetic field to be detected; and
a magnetic sensor, wherein
the magnetic sensor detects the magnetic field to be detected and generates a detection value corresponding to a relative position of the magnetic field generator with respect to the magnetic sensor,
the magnetic sensor includes a magnetoresistive element and a substrate that supports the magnetoresistive element,
the substrate includes a main surface including a flat surface,
the magnetic field to be detected received by the magnetoresistive element has a first direction within a first plane,
the magnetic field generator and the magnetic sensor are configured such that as the relative position of the magnetic field generator with respect to the magnetic sensor changes, the first direction changes within a predetermined variable range in the first plane,
the magnetoresistive element includes a first magnetic layer having first magnetization that can change in direction within a second plane parallel to the main surface,
the first plane and the second plane intersect at a dihedral angle other than 90°,
the magnetic field to be detected received by the magnetoresistive element can be divided into an in-plane component parallel to the second plane and a perpendicular component perpendicular to the second plane,
the in-plane component has a second direction that changes with a change in the first direction,
the direction of the first magnetization changes with a change in the second direction, and
the detection value depends on the direction of the first magnetization.

2. The position detection device according to claim 1, wherein the first magnetic layer has a characteristic that the first magnetization is saturated by the magnetic field to be detected if the first direction is in at least a part of the predetermined variable range.

3. The position detection device according to claim 1, wherein the magnetoresistive element further includes a second magnetic layer having second magnetization in a direction parallel to the second plane, and a gap layer located between the first magnetic layer and the second magnetic layer.

4. The position detection device according to claim 1, wherein the dihedral angle is in a range of 30° to 84°.

5. The position detection device according to claim 1, wherein:
the magnetic field generator is a magnet;
the relative position of the magnetic field generator with respect to the magnetic sensor can change so that a predetermined point in the magnet moves within a linear range of movement parallel to the main surface;
the magnet is magnetized in a direction parallel to a vertical plane that includes the range of movement and is perpendicular to the main surface; and
the magnetoresistive element is located to not intersect the vertical plane.

6. A position detection device comprising:
a magnet that generates a magnetic field to be detected; and
a magnetic sensor, wherein
the magnetic sensor detects the magnetic field to be detected and generates a detection value corresponding to a relative position of the magnet with respect to the magnetic sensor,
the magnetic sensor includes a magnetoresistive element and a substrate that supports the magnetoresistive element,
the substrate includes a main surface including a flat surface,
the magnetoresistive element includes a first magnetic layer having first magnetization that can change in direction with a direction of the magnetic field to be detected received by the magnetoresistive element within a reference plane parallel to the main surface,
the relative position of the magnet with respect to the magnetic sensor can change so that a predetermined point in the magnet moves within a linear range of movement parallel to the main surface,
the magnet is magnetized in a direction parallel to a vertical plane that includes the range of movement and is perpendicular to the main surface, and
the magnetoresistive element is located to not intersect the vertical plane.

* * * * *